Patented Feb. 27, 1945

2,370,394

UNITED STATES PATENT OFFICE 2,370,394

CHLORINATED PHENYLENE DIACETIC ACIDS

Oliver W. Cass, Niagara Falls, N. Y., assignor to E. I. du Pont de Nemours & Company, Wilmington, Del., a corporation of Delaware No Drawing. Application June 28, 1943,
Serial No. 492,589

4 Claims. (Cl. 260—515)

This invention relates to certain new chlorinated dibasic organic acids, and to a new and improved method by which they may be prepared. More particularly, this invention relates to the manufacture of stable aromatic dibasic organic acids characterized by containing halogen atoms in the aromatic nucleus. The particular dibasic organic acids which I have prepared for the first time are the p-phenylene diacetic acids containing 1, 2, or 3 chlorine atoms in the aromatic nucleus.

One of the objects of this invention is the preparation of new dibasic organic acids characterized by containing nuclear chlorine atoms. Another object of this invention is the preparation of the chlorine-containing p-phenylene diacetic acids from readily available starting materials, utilizing particularly the nuclear chlorinated p-xylylene dichlorides. Still another object of this invention is to render available a process for the preparation of these stable chlorinated dibasic organic acids, which process may be readily carried out on the industrial scale, utilizing as starting materials the available nuclear chlorinated p-xylylene dichlorides. These and still other objects of this invention will be apparent from the ensuing disclosure of certain preferred embodiments thereof.

The starting materials which I utilize in the preparation of my novel chlorinated dibasic organic acids, the p-xylylene dichlorides containing 1, 2, or 3 chlorine atoms substituted for nuclear hydrogen of the aromatic nucleus, are readily prepared in accordance with the method disclosed in my copending application, Serial No. 491,377, filed June 18, 1943. These chlorine-substituted p-xylylene dichlorides are represented by the following formulae:

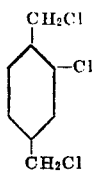

Monochloro-p-xylylene dichloride

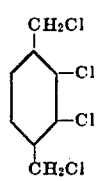 or 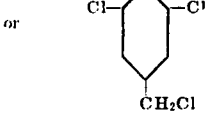

Dichloro-p-xylylene dichlorides

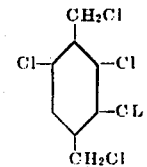

Trichloro-p-xylylene dichloride

When these chlorine-substituted p-xylylene dichlorides are converted in accordance with my process to the corresponding chlorinated phenylene diacetic acids there result dibasic acids which, by reason of the chlorine substituents, are characterized by decreased inflammability, lessened water sensitivity, and elevated melting points and boiling points. Their solubility in various solvents is also much different from that of the corresponding non-chlorine containing acids. They are valuable of themselves for various purposes where a dibasic acid is required, and may also be utilized as intermediates in the preparation of other valuable chemical products such as organic esters, polyesters, amides and polyamides. The chlorine forming a part of the nuclear portion of the molecule is present in a very stable and chemically inert form, and is not readily removed by usual chemical reactions.

In preparing these new chlorine-containing organic dibasic acids I first convert the nuclear chlorinated p-xylylene dichlorides to the corresponding dicyanides. This is readily accomplished by reacting the dichlorides with an alkali metal cyanide, such as sodium cyanide or potassium cyanide. The reaction is preferably carried out in the presence of a solvent or partial solvent for the alkali metal cyanide and organic compounds such as a 75% solution of ethanol in water, the reaction mixture being alkaline in reaction. During this reaction the nuclear chlorine atoms remain unchanged in the molecule, the chlorine atoms of the aliphatic side chains being replaced by the cyano group, CN. The dicyanide is then hydrolyzed under appropriate conditions, either in alkaline or acidic reaction media, and converted to the desired chlorine-containing phenylene diacetic acids.

As examples of my process for the preparation of these valuable dibasic acids, the following illustrations are given:

Example 1

2-chloro-p-xylylene dichloride (melting point 49° C. to 49.5° C.) prepared in accordance with my copending application, Serial No. 491,377, filed June 18, 1943, in the amount of 652 parts was charged into a reaction vessel equipped with an agitator, a reflux condenser, and means for heating and cooling the contents of the vessel. 334 parts of 96% commercial sodium cyanide and 2540 parts of 75% ethyl alcohol were then charged into the reaction vessel. The contents were heated to reflux temperature and were maintained at this temperature for a period of approximately six hours. During this time the contents were thoroughly agitated by means of the stirrer.

At the end of the six-hour reaction period the contents of the reaction vessel were filtered and the filter cake thoroughly washed with an additional amount of 75% ethyl alcohol. The filtrate and washings were then brought together, and subjected to distillation in order to remove the ethyl alcohol and water. There remained in the still 551 parts of crude 2-chloro-p-xylylene dicyanide. The filter cake showed, upon analysis, practically quantitative conversion of the sodium cyanide to sodium chloride.

Without being subjected to further purification, the crude 2-chloro-p-xylylene dicyanide in the amount of 551 parts was charged into a reaction vessel together with 3500 parts of water containing dissolved therein 260 parts of caustic soda (sodium hydroxide). The contents of the reaction vessel were then heated under agitation until no further amounts of ammonia escaped from the reactor. After approximately 12 hours of heating the evolution of ammonia had ceased and the contents of the reaction vessel were cooled and filtered to remove therefrom a small quantity of insoluble tar which had formed during the reaction. The filtrate was acidified and the precipitate of 2-chloro-p-xylylene diacetic acid filtered off.

The crude 2-chloro-p-xylylene diacetic acid as precipitated was yellow in color, but a colorless product was secured by recrystallization from a methanol-water mixture. There resulted a crystalline colorless acid having a melting point of 218 to 221° C. and possessing a neutral equivalent of very close to 114.2. Analyses of the crystalline acid gave a chlorine value of 15.4% and thus showed that the nuclear chlorine had not been removed by the treatment since the value obtained agrees very closely with the theoretical value of 15.5% of nuclear chlorine. The yield of the desired dibasic acid was very high, approaching the quantitative.

Example 2

The procedure described in Example 1 was followed starting, however, with 2,5-dichloro-p-phenylene dichloride which product was prepared by following the method described in my previously-identified copending application. After replacing the side chain chlorine atoms by the cyano group, hydrolyzing the cyano groups to ammonia and the desired salt of the dibasic acid in alkaline solution, and acidifying the reaction mixture, there was precipitated 2,5-dichloro-p-phenylene diacetic acid. This was a light yellow powdery material having a neutral equivalent very closely approximating the theoretical value of 131.5.

Instead of carrying out the hydrolysis of the chlorinated xylylene dicyanides in alkaline solution, it is also possible to hydrolyze these dicyanides to the diacids by treatment in an acidic solution, as with concentrated phosphoric acid. In acidic hydrolysis a temperature of 200 to 250° C. is maintained, preferably from four to five hours. When using phosphoric acid the free acid is obtained directly, together with an ammonium phosphate, which latter product may be washed out of the crude acid. In order to purify the crude acid it is desirable to dissolve it in dilute caustic soda, the solution then being filtered and the diacid secured by reprecipitation by the addition of an acidic compound or acid.

The chlorinated phenylene diacetic acids prepared in accordance with my invention exhibit the typical reactions of aliphatic dibasic acids, including those of ester and polyester formation, and the formation of amides and polyamides. In all these reactions the nuclear chlorine remains unattacked and is completely inert and stable. Esters of these acids may be incorporated as ingredients in plasticizers, and the acids themselves may be utilized as intermediates in the formation of organic fibers.

Various changes obvious to skilled chemists might be incorporated in the preferred procedures given above as illustrative of my method for the preparation of these new dibasic acids, and it is intended that these modified procedures shall be included within the scope of my invention as defined by the appended claims.

I claim:

1. A nuclear chlorinated p-phenylene diacetic acid having the following formula:

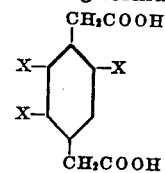

wherein X represents a member of the group consisting of chlorine and hydrogen, at least one of said X's being chlorine.

2. Monochloro-p-phenylene diacetic acid.
3. Dichloro-p-phenylene diacetic acid.
4. Trichloro-p-phenylene diacetic acid.

OLIVER W. CASS.